United States Patent [19]

Morita et al.

[11] Patent Number: 5,016,722
[45] Date of Patent: May 21, 1991

[54] CAB STRUCTURE FOR RIDING TYPE WORKING VEHICLE

[75] Inventors: Shigeru Morita; Terutaka Takei; Yoshihiro Kawahara; Yoshikazu Togoshi, all of Osaka, Japan

[73] Assignee: Kubota Ltd., Osaka, Japan

[21] Appl. No.: 425,646

[22] Filed: Oct. 20, 1989

[30] Foreign Application Priority Data

Jan. 31, 1989 [JP] Japan .................................. 1-23391
Apr. 27, 1989 [JP] Japan ............................. 1-50793[U]

[51] Int. Cl.⁵ ........................ B62D 33/06; B62D 1/18
[52] U.S. Cl. ................................ 180/89.14; 280/775;
280/779; 296/190; 296/65.1; 296/68; 56/14.7
[58] Field of Search ...................... 280/771, 775, 779;
180/89.14; 296/190, 68, 65.1; 56/14.7

[56] References Cited

U.S. PATENT DOCUMENTS 2,873,979 2/1959 Venditty et al. .................. 180/89.14
3,216,521 11/1965 Ulrich ................................. 280/775
3,362,247 1/1968 Watts .................................. 280/775
3,799,569 3/1974 Baker ................................. 280/775
4,076,302 2/1978 Sable ............................... 180/89.14
4,696,508 9/1987 Brautigam ......................... 296/65.1

Primary Examiner—Charles A. Marmor
Assistant Examiner—Tamara L. Finlay
Attorney, Agent, or Firm—Jordan and Hamburg

[57] ABSTRACT

A cab structure for a working vehicle comprising a driver's seat, and a steering wheel attached to a free end of a curved steering column. The steering column extends forwardly from a front fender located laterally of the driver's seat and then inwardly toward longitudinal centerline of the vehicle body. The steering wheel is pivotable, for positional adjustment, about an axis of the inwardly extending portion of the steering column. The steering column further carries a steering valve at the free end thereof, which is connected to a steering cylinder and a hydraulic pump through hydraulic rubber pipes extending through the steering column.

5 Claims, 7 Drawing Sheets

CAB STRUCTURE FOR RIDING TYPE WORKING VEHICLE

BACKGROUND OF THE INVENTION

1. Field of the Invention

The present invention relates to a cab structure for a riding type working vehicle, which includes a steering column supporting a steering wheel extending upwardly from a vehicle frame.

2. Description of the Prior Art

Conventional riding type working vehicles have a steering column extending upwardly from the vehicle body at a position right in front of a driver's seat.

This construction compels the driver to run the vehicle with his or her feet placed on opposite sides of the steering column. The presence of the steering column allows reduced foot spaces, and tends to impede pedal operations. In the case of a vehicle carrying a working implement at the front, the steering column is often obstructive to the driver's observation of an operation. To avoid the steering column being obstructive to the driver, it has to be erected at a forward position remote from the driver's seat so that the driver need not place his or her feet at opposite sides of the steering column. This would require the driver's cab to have an increased length, which in turn results in an elongated vehicle body.

SUMMARY OF THE INVENTION

An object of the present invention is to provide a working vehicle which eliminates the above-noted disadvantage by improving not only the steering column aspect but the interlocking structure between the steering wheel and steerable ground wheels, and which has a simple construction for enabling positional adjustment of the steering wheel as well as protection of the interlocking structure.

In order to achieve the above object, a cab structure for a riding type working vehicle according to the present invention comprises a driver's seat, a curved steering column including a vertical arm portion extending from a region outwardly of the driver's seat forwardly of a vehicle body, and a horizontal arm portion extending from an upper end of the vertical arm portion toward a longitudinal centerline of the vehicle body, a steering wheel attached to a free end region of the horizontal arm portion to be pivotable about an axis of the horizontal arm portion, and link means extending through the steering column for transmitting movement of the steering wheel to steerable wheels.

In the above construction, the curved steering column has a vertical arm portion disposed in a region laterally outwardly of the driver's seat, and a horizontal arm portion extending inwardly from the upper end of the vertical arm portion and supporting the steering wheel. Thus, the steering wheel is disposed forwardly of the driver's seat, with the steering column not located between or close to the driver's feet and not obstructing the driver's forward view. Further, the link means such as rotary shafts, interlocking wires or hydraulic pipes are arranged inside the steering column, thus out of interference with the driver's feet and the driver's forward view.

Where the link means comprises connecting pipes, the pipes may be pushed into the steering column through one end thereof to be placed therein by utilizing flexibility of the pipes. In this case, the steering column acts as a protective covering for the pipes to protect them from damage through contact with hard objects.

The steering wheel may be attached to the horizontal arm portion of the steering column to be pivotable relative thereto. This may be achieved by using a rotatable connecting element between the horizontal arm portion and steering wheel, or a wheel mounting part of the horizontal arm portion rotatable relative to other parts. Thus, a tilt adjustment of the steering wheel may be made possible only by adding an adjusting mechanism to the steering column without rendering the link means between the steering wheel and steerable ground wheels vulnerable to the influences of the tilting of the steering wheel. That is, the steering wheel is tiltable without making a special provision for the link means to accommodate the wheel tilt.

In addition to the tilting of the steering wheel, the vertical arm portion as well as the driver's seat and engine hood may be arranged vertically pivotable. In this case, when inspecting the engine or other sections underneath the driver's seat, a large area may be opened to expose the component to be checked by moving the driver's seat and hood to a great extent upwardly and forwardly, with the steering wheel turned retracted forwardly by swinging it forwardly and/or turning over the vertical arm portion forwardly.

Where the driver's seat is attached to the engine hood, the operation to move the driver's seat to the upward retracted position or back to a use position and the operation to open and close the engine hood may be carried out in one effort when inspecting the engine.

The above construction has the following advantages: The curved steering column in which the link means is mounted is disposed away from the driver's feet, which allows the driver's cab to have a relatively small length, provides an improved comfort with a large space secured for the driver's feet, facilitates pedal operations and renders the vehicle easy to control with a reduced body length. Where a working implement is connected to the front of the vehicle, this cab structure enables a clear view of an operation for improved efficiency.

The steering wheel is tiltable to a position for facilitating operation by the driver regardless of his or her size. The wheel adjusting structure is simple and low cost to manufacture.

The steering apparatus comprises the hydraulic type with the steering wheel connected to the steerable wheels through connecting pipes. The pipes being contained in the steering column allows an increased space for foot movement, while the steering column provides an inexpensive protective covering for the pipes.

Where the vertical arm portion and driver's seat are vertically pivotably attached, the steering wheel is retractable to a great extent by both tilting the steering wheel and turning over the steering column. Consequently, a large area may be opened under the driver's seat to allow an efficient operation in attending to the components under the driver's seat.

Where the driver's seat is attached to the engine hood, the opening or closing operation may be carried out in one effort, thereby to allow an efficient operation to be carried out in inspecting or servicing the engine through a large opening area.

In a preferred embodiment of the invention, the vertical arm portion is attached to the vehicle body to be pivotable about an axis extending transversely of the vehicle body.

According to this construction, the steering wheel may be displaced to a large extent by turning over the steering column carrying the steering wheel at an upper end thereof. The steering wheel may be pivotable relative to the steering column, thereby enabling fine adjustment of the steering wheel position.

Since the steering column is pivotable, the steering wheel is positionally adjustable over a greater range than in the prior art. Thus, the steering wheel may easily be moved to a position not obstructive to the driver's forward view, to enable an efficient operation.

Other features and advantages of the present invention will be apparent from the following description.

BRIEF DESCRIPTION OF THE DRAWINGS

The drawings show a cab structure for a riding type working vehicle according to the present invention, in which.

DESCRIPTION OF THE PREFERRED EMBODIMENTS

Figure 1:
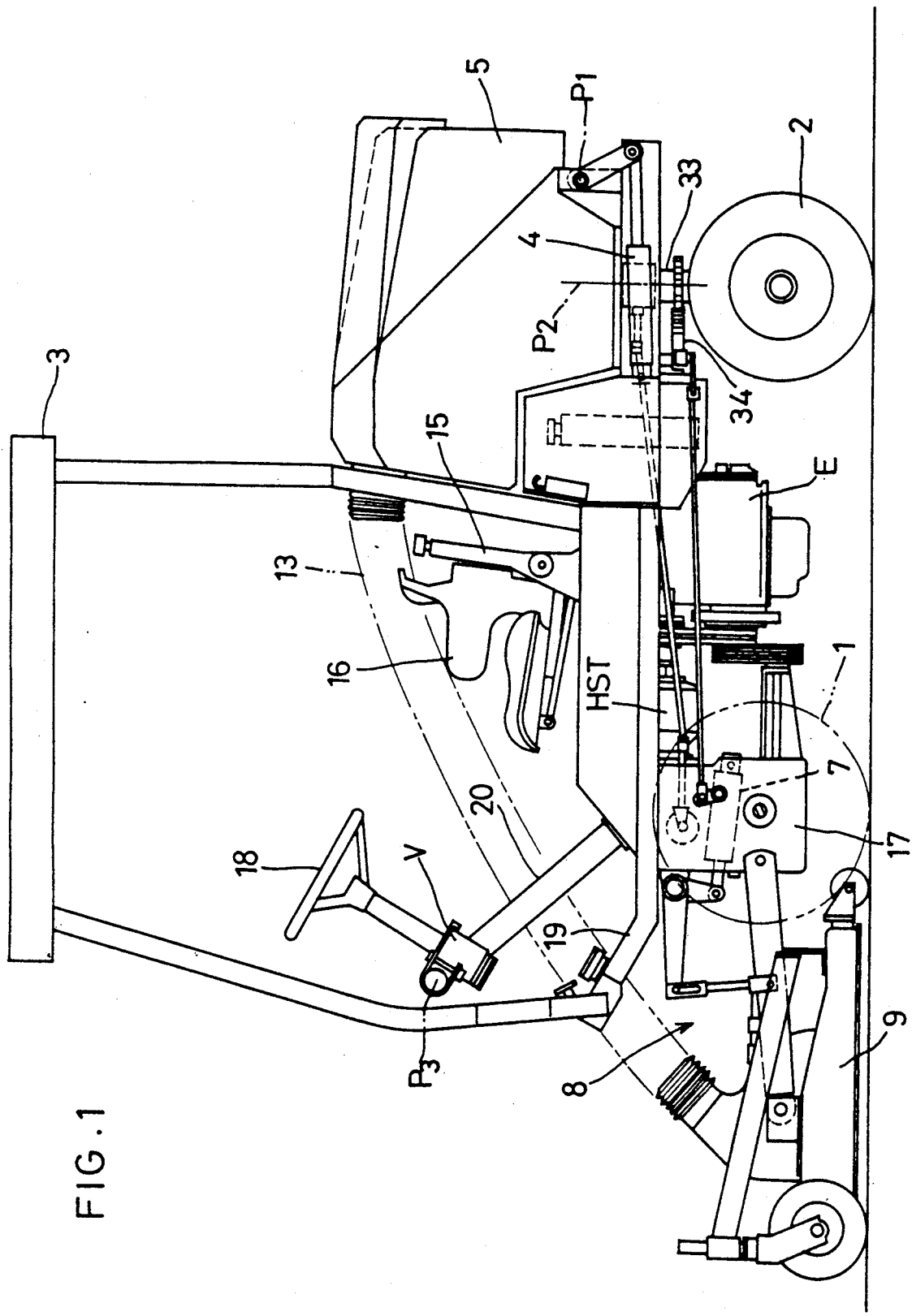
FIG. 1 is a side view, partly broken away, of a riding type lawn mower.
Figure 2:
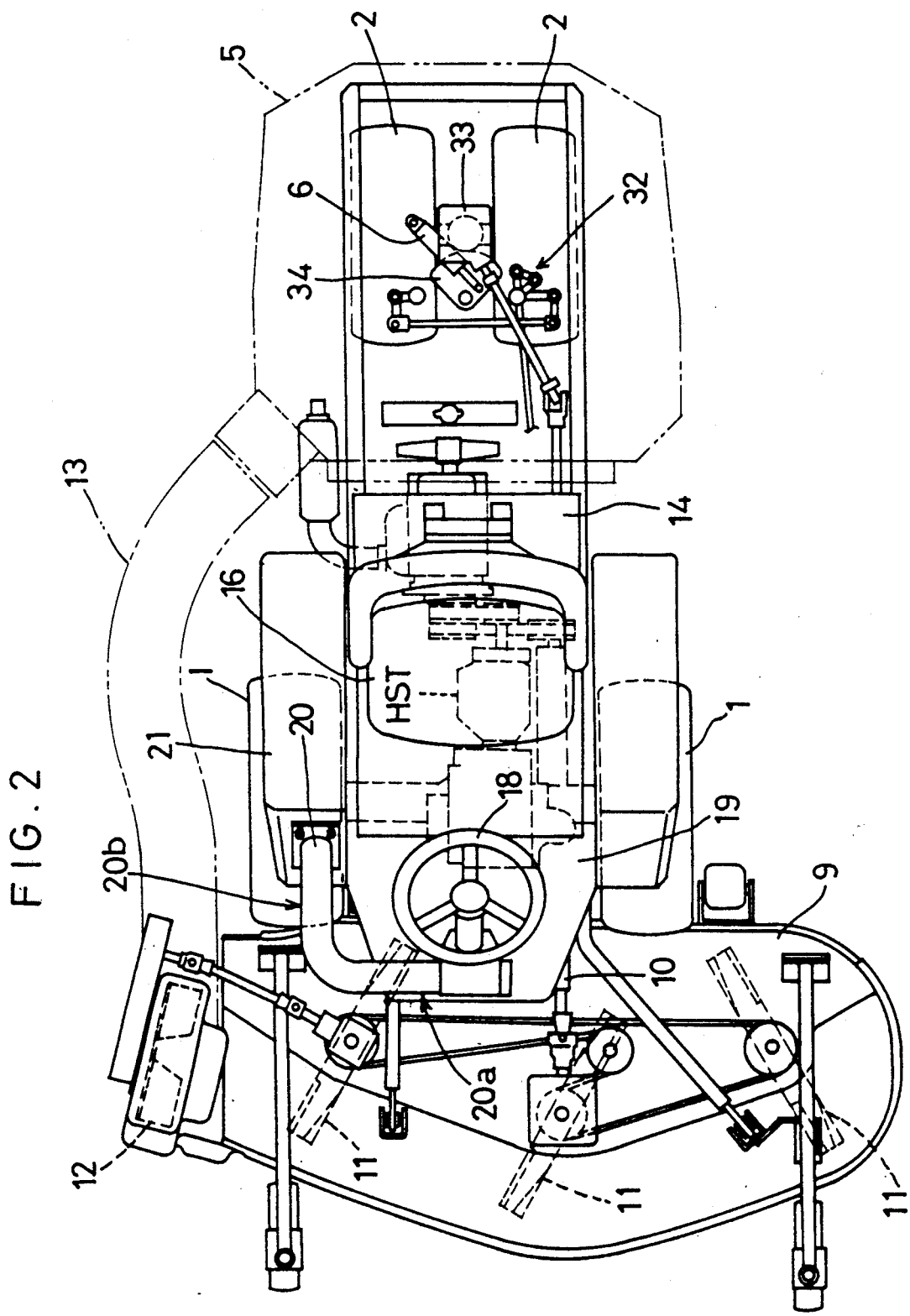
FIG. 2 is a plan view, partly broken away, of the lawn mower.

Referring to FIGS. 1 and 2, a riding type lawn mower comprises front drive wheels 1, rear wheels 2, a driver's cab including a canopy 3, and a grass catcher 5 pivotable on an axis P1 by a dump cylinder 4 for disposal of its contents. The rear wheels 2 are steerable on axes P2 by a steering cylinder 6. The lawn mower further comprises a grass cutting unit 9 connected to a front end of the vehicle body to be vertically oscillatable by a lift cylinder 7 through a link mechanism 8. The grass cutting unit 9 includes cutting blades 11 and a rotary fan 12 driven by a rotary shaft 10 extending from the vehicle body. Grass clippings are delivered as entrained on air flows generated by the rotary fan 12 through a discharge duct 13 to the grass catcher 5.

The driver's cab includes a driver's seat 16 mounted on top of an engine hood 14 through a seat support 15, and a steering wheel 18 disposed above a foot rest 19 and supported by a steering column 20.

Figure 3:
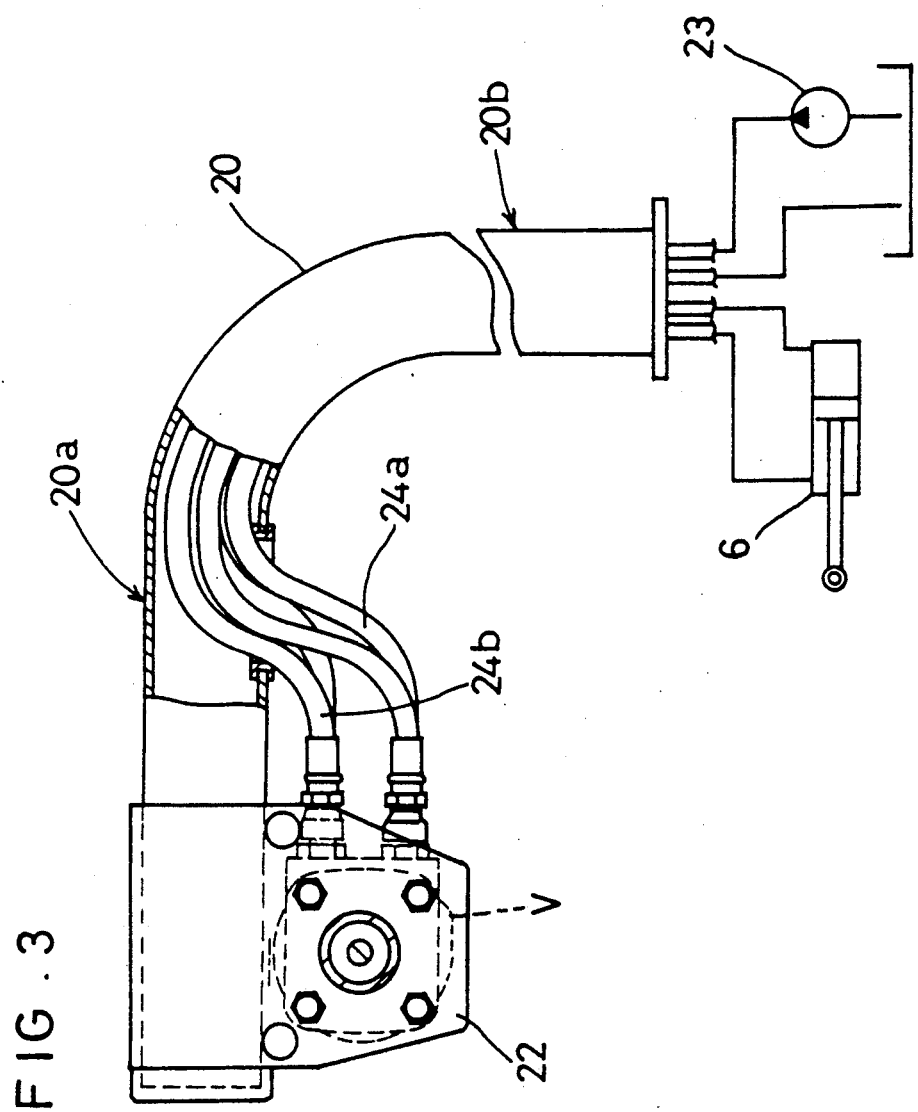
FIG. 3 is a plan view, partly broken away, of a steering column.
Figure 5:
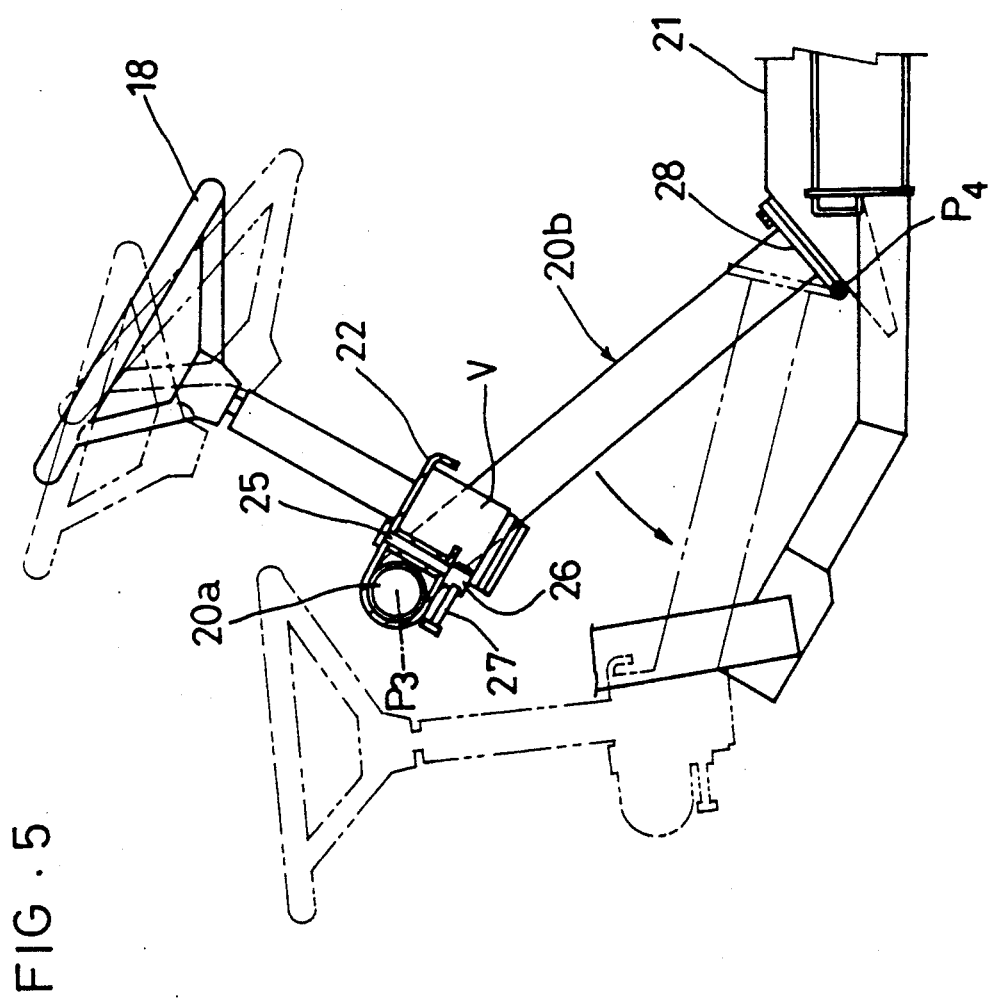
FIG. 5 is a side view of a steering wheel and associated components.

The steering column 20 is formed of a curved round pipe. As shown in FIGS. 1 and 2, the steering column 20 includes a vertical arm portion 20b extending forwardly and upwardly from a forward end of a front wheel fender 21 disposed laterally of the vehicle body, and a horizontal arm portion 20a extending from an upper end of the vertical arm portion 20b inwardly of the vehicle body. As shown in FIG. 5, the steering wheel 18 is attached, together with a steering valve V, to a distal end of the horizontal arm portion 20a through a bracket 22 formed of a sheet metal. As shown in FIG. 3, the steering valve V is connected to a hydraulic pump 23 and the steering cylinder 6 through hydraulic rubber pipes 24a and 24b extending through interiors of the horizontal and vertical arm portions 20a and 20b of the steering column 20. Thus, the steering wheel 18 is disposed forwardly of the driver's seat 16, with the steering column 20 and hydraulic rubber pipes 24a and 24b located away from the driver's feet. The steering column 20 acts as a protective covering for the hydraulic rubber pipes 24a and 24b.

Figure 4:
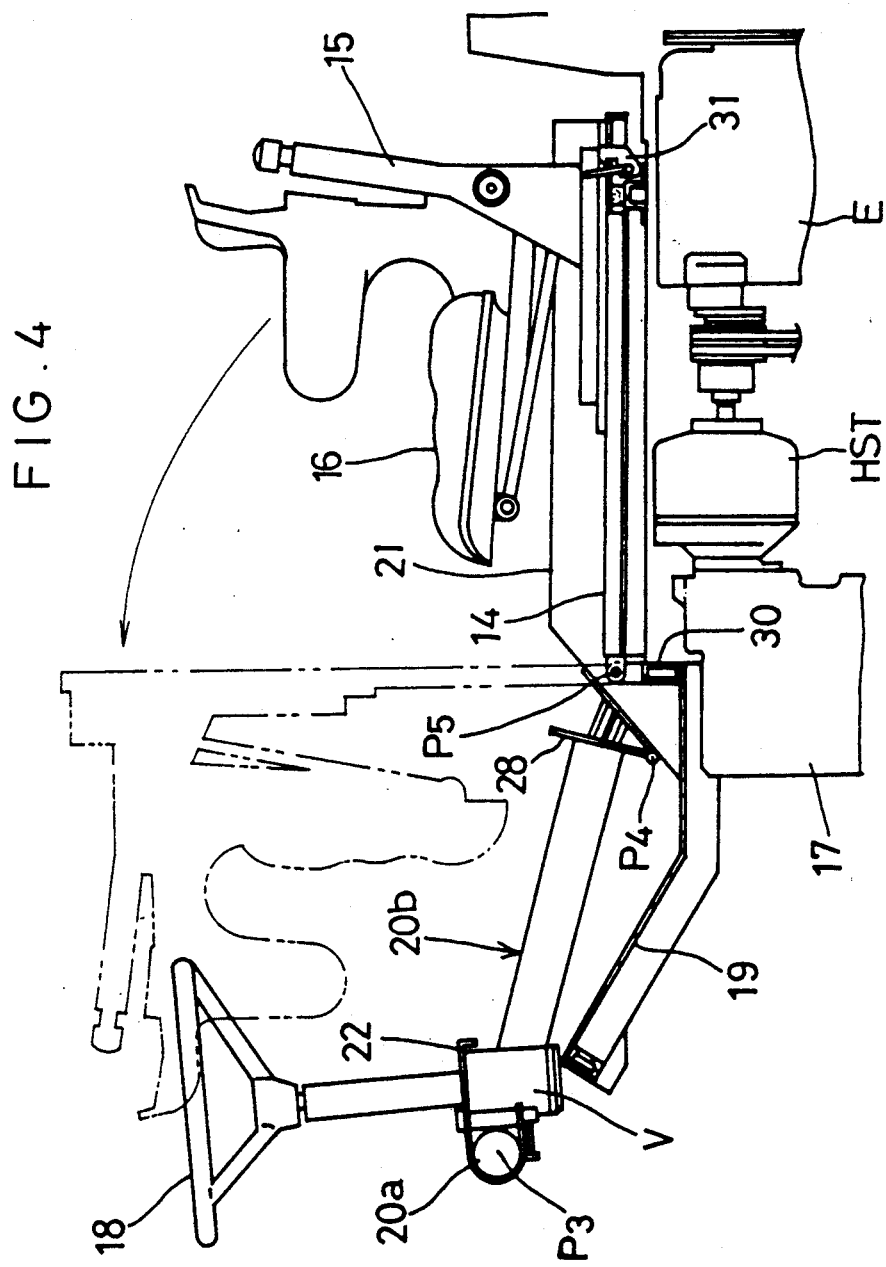
FIG. 4 is a side view, partly broken away, of a driver's section.
Figure 6:
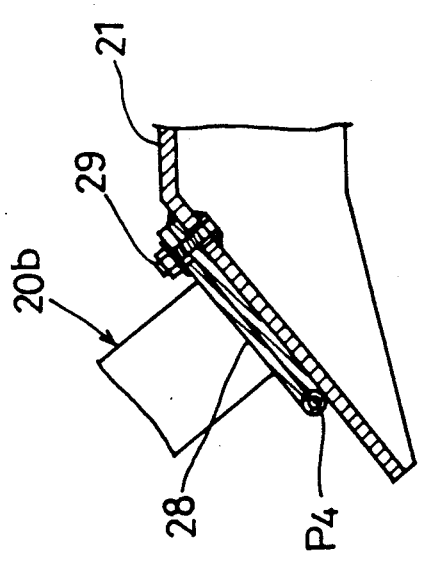
FIG. 6 is a sectional view of a steering column attaching structure.

The bracket 22 is secured to the horizontal arm portion 20a by bolts 25 and nuts 26 meshed with the bolts 25. The nuts 26 may be turned by levers 27 to loosen the bracket 22, whereby the steering wheel 18 is pivotable about an axis P3 extending transversely of the vehicle body for adjustment relative to the horizontal arm portion 20a. The vertical arm portion 20b is attached to the front wheel fender 21 through a hinge 28 to be pivotable about an axis P4 extending transversely of the vehicle body, between an erected operative position as shown in a solid line in FIG. 5 and a forwardly retracted position as shown in a phantom line in FIG. 5. Normally, the vertical arm portion 20b is locked in the erected operative position by lock bolts 29 as shown in FIG. 6. Referring to FIG. 4, the engine hood 14 is attached to a vehicle frame 30 to be vertically pivotable about a transverse axis P5 at a forward end of the hood 14 between an open position and a closed position. The hood 14 is lockable in the closed position by a hook type locking device 31. The driver's seat 16 mounted on the hood 14 is movable with opening and closing of the hood 14, between a use position as shown in a solid line in FIG. 4 and a forwardly and upwardly retracted position as shown in a phantom line in FIG. 4.

Thus the steering wheel 18 is tiltable to a position for facilitating manipulation by the driver regardless of his or her size, which is effected by loosening the bracket 22 and moving the steering wheel 18 toward or away from the driver. The steering wheel 18 may be tilted forwardly, with the steering column 20 turned over, when inspecting an engine E, a hydrostatic transmission HST or a gearbox 17. This allows the engine hood 14 to be lifted to a greater extent than when opening the hood 14 with the steering wheel 18 and steering column 20 remaining in the operative or erected position. Consequently, a large area above the component to be checked may be opened with the driver's seat 16 and engine hood 14 liftable in one effort.

FIG. 2 also shows a link mechanism 32 for transmitting torque of a steering gear 34 rotatable by a steering cylinder 6 and meshed with a rear transmission case 33, to a front wheel clutch (not shown) of the gearbox 17 to disengage the clutch when the rear wheels 2 are steered to a predetermined angle.

Figure 7:
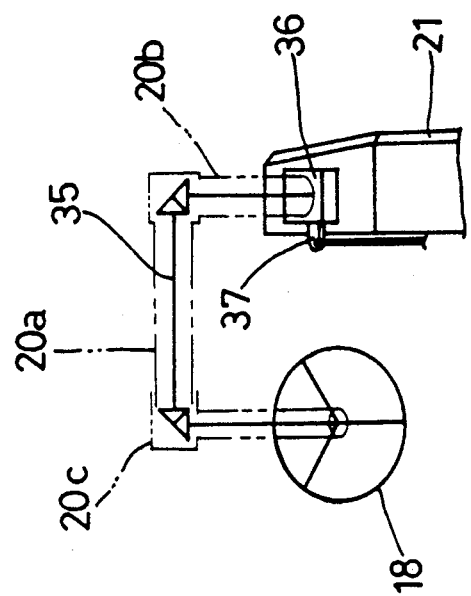
FIG. 7 is a schematic view of an interlocking device according to a modified embodiment.

FIG. 7 shows a modified steering apparatus, in which the steering wheel 18 is operatively connected to a pitman arm 37 of a steering gear 36 through a transmission mechanism 35 including rotary shafts and bevel gearing arranged in the steering column 20. The steering column 20 includes a wheel mount 20c rotatably attached to the horizontal arm portion 20a, thereby enabling a tilt adjustment of the steering wheel 18.

The illustrated working vehicle may carry other implements than the grass cutting unit 9, such as a device for cleaning lawn or road surfaces or a rotary plow.

Figure 8:
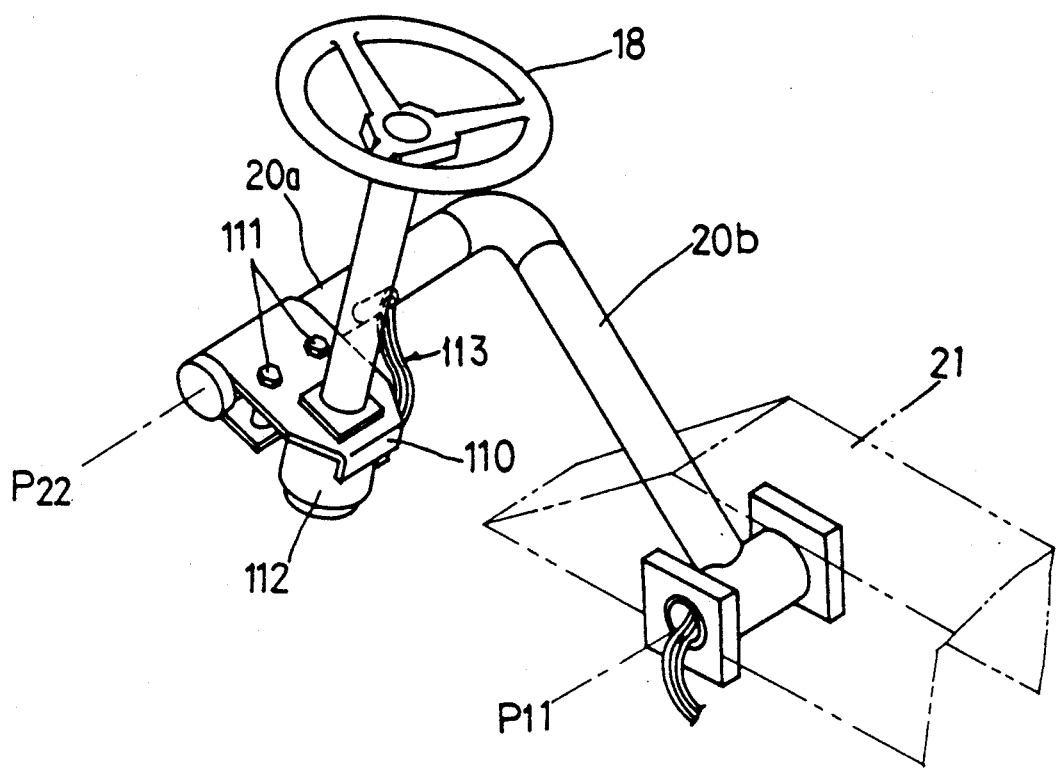
FIG. 8 is a perspective view of the steering wheel and steering stem.

FIG. 8 shows a further embodiment in which the vertical arm portion 20b is attached to the fender 21 to be vertically pivotable and lockable on a transverse axis P11. The steering wheel 18 is attached to a free end region of the horizontal arm portion 20a. More particularly, the horizontal arm portion 20a carries a bracket 110 formed of a plate wound on and fixed by bolts 111 to the upper end thereof. A hydraulic unit 112 is secured to the bracket 110 for steering the rear wheels 2. The steering wheel 18 is attached to the hydraulic unit 112.

Hydraulic hoses 113 extend from the hydraulic unit 112 through the steering column 20 to be connected to a power steering unit (not shown) provided on the vehicle body. These components constitute a fully hydraulic power steering mechanism.

According to this construction, the bolts 111 may be loosened to render the steering wheel 18, bracket 110 and hydraulic unit 112 vertically pivotable in unison about the axis P22 of the horizontal arm portion 20a to vary the position of steering wheel 18.

Figure 9:
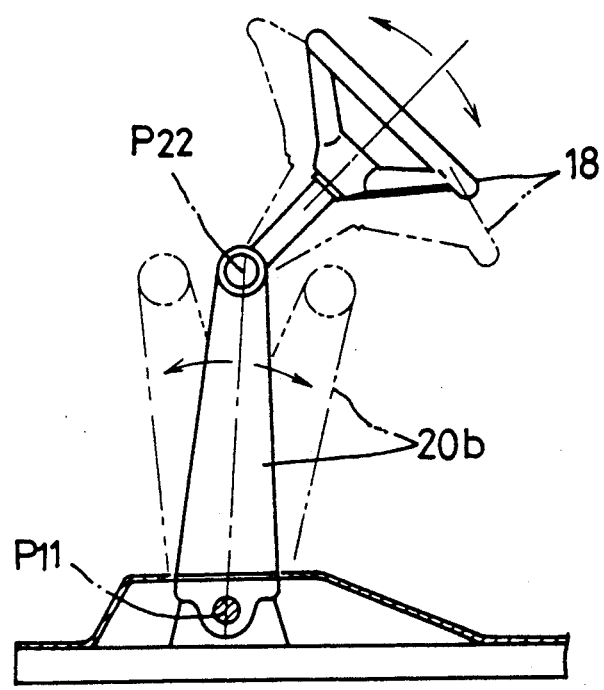
FIG. 9 is a side view of a steering wheel and a steering stem according to a different embodiment.

In this embodiment, the entire steering column 20 is vertically pivotable. However, as shown in FIG. 9, the entire steering column 20 may be pivotable back and forth about the transverse axis P11.

What is claimed is:

1. A cab structure for a riding type working vehicle comprising:
    a driver's seat,
    a curved steering column including a vertical arm portion extending from a region outwardly of said driver's seat forwardly of a vehicle body, and a horizontal arm portion extending from an upper end of said vertical arm portion toward a longitudinal centerline of the vehicle body, the vertical and the horizontal arm portions together forming an inverted L,
    a steering wheel and means connecting and attaching the steering wheel to a free end region of said horizontal arm portion to be pivotable about an axis of said horizontal arm portion, the connecting and attaching means supporting the entire steering wheel substantially above said axis so that a substantial free space is provided under said horizontal arm portion however the steering wheel is pivoted, and
    link means extending through said steering column for transmitting movement of said steering wheel to steerable wheels.

2. A cab structure as claimed in claim 1 wherein said link means comprises a hydraulic circuit including a steering valve, a steering cylinder and a hydraulic pump, said steering valve being attached to said horizontal arm portion and connected to said steering cylinder through pipes disposed inside said steering column.

3. A cab structure as claimed in claim 1 wherein said vertical arm portion is attached to the vehicle body to be pivotable about an axis extending transversely of the vehicle body.

4. A cab structure as claimed in claim 3 wherein said driver's seat is movable between a use position and an upward position upwardly and forwardly of said use position.

5. A cab structure as claimed in claim 1 further comprising an engine hood pivotable about an axis disposed at a forward end thereof and extending transversely of the vehicle body, between a closed position and an open position, said driver's seat being mounted on said engine hood to be pivotable therewith.

* * * * *